United States Patent
Chang et al.

(10) Patent No.: US 10,430,959 B2
(45) Date of Patent: Oct. 1, 2019

(54) METHOD AND APPARATUS FOR MATCHING STEREO IMAGES

(71) Applicant: Samsung Electronics Co., Ltd., Suwon-si, Gyeonggi-do (KR)

(72) Inventors: Hyun Sung Chang, Seoul (KR); Hyoseok Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 101 days.

(21) Appl. No.: 15/358,744

(22) Filed: Nov. 22, 2016

(65) Prior Publication Data

US 2017/0169310 A1    Jun. 15, 2017

(30) Foreign Application Priority Data

Dec. 14, 2015 (KR) .................. 10-2015-0178366

(51) Int. Cl.
| | |
|---|---|
| *G06T 7/593* | (2017.01) |
| *H04N 13/128* | (2018.01) |
| *H04N 13/00* | (2018.01) |
| *H04N 13/271* | (2018.01) |
| *G06K 9/62* | (2006.01) |
| *H04N 13/15* | (2018.01) |
| *H04N 13/239* | (2018.01) |

(52) U.S. Cl.
CPC .......... *G06T 7/593* (2017.01); *H04N 13/128* (2018.05); *G06K 9/6203* (2013.01); *G06T 2207/10021* (2013.01); *G06T 2207/20021* (2013.01); *H04N 13/15* (2018.05); *H04N 13/239* (2018.05); *H04N 13/271* (2018.05); *H04N 2013/0081* (2013.01); *H04N 2013/0092* (2013.01)

(58) Field of Classification Search
CPC ............................. H04N 13/271; G06T 7/593
USPC ......................................................... 382/154
See application file for complete search history.

(56) References Cited

U.S. PATENT DOCUMENTS

| | | | |
|---|---|---|---|
| 6,470,097 B1 * | 10/2002 | Lai ......................... | G06T 5/003 382/236 |
| 8,670,630 B1 | 3/2014 | Kwatra | |
| 2007/0086646 A1 * | 4/2007 | Yang ....................... | G06K 9/20 382/154 |
| 2007/0147696 A1 * | 6/2007 | Karl ...................... | G06T 11/005 382/254 |
| 2008/0287819 A1 | 11/2008 | Gregson et al. | |

(Continued)

FOREIGN PATENT DOCUMENTS

| | | |
|---|---|---|
| CN | 103049892 A | 4/2013 |
| KR | 20140133384 A | 11/2014 |

OTHER PUBLICATIONS

Christoph Rhemann, et al., "Fast Cost-Volume Filtering for Visual Correspondence and Beyond", Conference on *Computer Vision and Pattern Recognition (CVPR)*, Jun. 20-25, 2011 IEEE, Providence, RI, pp. 3017-3024.

(Continued)

*Primary Examiner* — Justin P. Misleh
(74) *Attorney, Agent, or Firm* — Harness, Dickey & Pierce, P.L.C.

(57) ABSTRACT

A method and apparatus for matching stereo images including calculating a data cost of at least one image, calculating a smoothness cost of the image, and matching pixels among pixels of a plurality of images based on the data cost and the smoothness cost.

16 Claims, 10 Drawing Sheets

(56) References Cited

U.S. PATENT DOCUMENTS

| | | | |
|---|---|---|---|
| 2012/0098932 A1* | 4/2012 | Kim | G06T 7/593 |
| | | | 348/43 |
| 2013/0169819 A1* | 7/2013 | Strandemar | H04N 5/23248 |
| | | | 348/164 |
| 2013/0223725 A1* | 8/2013 | Jeong | G06T 7/0075 |
| | | | 382/154 |
| 2014/0153816 A1 | 6/2014 | Cohen et al. | |
| 2014/0267918 A1 | 9/2014 | Medasani et al. | |
| 2015/0249791 A1* | 9/2015 | Somanath | H04N 5/262 |
| | | | 348/218.1 |
| 2016/0150210 A1 | 5/2016 | Chang et al. | |
| 2018/0240247 A1* | 8/2018 | Cutu | G06T 7/593 |

OTHER PUBLICATIONS

Kostadin Dabov, et al., "Image denoising by sparse 3D transform-domain collaborative filtering", IEEE Transactions on Image Processing. vol. 16, No. 8, Aug. 2007.

Si Lu, et al., "Depth Enhancement via Low-rank Matrix Completion", 2014 IEEE Conference on Computer Vision and Pattern Recognition, Jun. 23-28, 2014, pp. 4321-4328.

Kaiming He, et al. "Guided Image Filtering", IEEE Transactions on Pattern Analysis and Machine Intelligence, vol. 35, Issue 6, pp. 1397-1409, Oct. 2, 2012.

\* cited by examiner

METHOD AND APPARATUS FOR MATCHING STEREO IMAGES

CROSS-REFERENCE TO RELATED APPLICATION

This application claims under 35 U.S.C. § 119 to Korean Patent Application No. 10-2015-0178366, filed on Dec. 14, 2015, at the Korean Intellectual Property Office, the entire contents of which are incorporated herein by reference in its entirety.

BACKGROUND

1. Field

At least one example embodiment relates to a method and/or apparatus for matching stereo images. For example, at least some example embodiments relate to a method of matching stereo images based on a geometric structure of an image.

2. Description of the Related Art

Sight is one of the senses a human uses to obtain information on an environment. By their eyes, a human may recognize a position of an object, for example, the relative remoteness or nearness of the object. In more detail, visual information obtained through the eyes may be synthesized into a single piece of distance information.

A stereo camera system may be used as a mechanism to implement such a visual structure. The stereo camera system may perform stereo matching or stereo image matching with respect to images acquired using two cameras. In the stereo matching process, the stereo camera system may generate disparity maps based on a disparity between the two cameras.

SUMMARY

At least one example embodiment relates to a method of matching stereo images.

In some example embodiments, the method includes initializing a disparity value of at least one image of the stereo images captured from different points of view; generating an energy function based on a smoothness cost and a data cost associated with the at least one image, the smoothness cost being based on a similarity between a block of the at least one image and at least one neighboring block, and the data cost being based on a pixel value of matched pixels between the stereo images according to the disparity value associated therewith; and matching pixels between the stereo images to generate the matched pixels that reduce a value of the energy function.

In some example embodiments, the initializing includes generating an initial disparity map for each of the at least one image.

In some example embodiments, the method further includes re-generating the disparity map associated with the at least one image based on the matched pixels.

In some example embodiments, the matching includes matching the pixels between the stereo images to minimize the value of the energy function based on a coordinate descent algorithm.

In some example embodiments, the matching includes minimizing the smoothness cost of the energy function; minimizing the data cost of the energy function; and verifying whether a condition associated with the energy function is satisfied.

In some example embodiments, the matching further includes adjusting at least one parameter of the energy function, if the verifying indicates that the condition is not satisfied.

In some example embodiments, the condition is whether the value of the energy function is at least similar to a previously calculated value of the energy function.

In some example embodiments, the condition is whether the matching has been iteratively performed a threshold number of times.

In some example embodiments, the minimizing includes minimizing the smoothness cost based on a noise removal algorithm.

In some example embodiments, the minimizing includes generating the block of which a center is a pixel of the at least one image; detecting the neighboring blocks having geometric structures similar to that of the block in the image; and minimizing the smoothness cost by collaboratively filtering the block and the neighboring blocks.

In some example embodiments, the initializing includes initializing a disparity value for the disparity map associated with each of the at least one image, wherein the data cost is calculated based on all pixels of the stereo images.

In some example embodiments, the method further includes calculating the data cost based on geometric structures among corresponding pixels.

Some example embodiments relate to a non-transitory computer-readable medium comprising program code that, when executed by a processor, configures the processor to match stereo images.

In some example embodiments, the processor matches the store images by, initializing a disparity value of at least one image of stereo images captured from different points of view, generating an energy function based on a smoothness cost and a data cost associated with the at least one image, the smoothness cost being based on a similarity between a block of the at least one image and at least one neighboring block, and the data cost being based on a pixel value of matched pixels between the stereo images according to the disparity value associated therewith, and matching pixels between the stereo images to generate the matched pixels that reduce a value of the energy function.

Some example embodiments relate to an apparatus configured to match stereo images.

In some example embodiments, the apparatus includes a memory device configured to store the stereo images captured from different points of view; and a processor configured to, initialize a disparity value of at least one image of the stereo images, generate an energy function based on a smoothness cost and a data cost of the at least one image, the smoothness cost being based on a similarity between a block of the at least one image and at least one neighboring block, and the data cost being based on a pixel value of matched pixels between the stereo images according to the disparity value associated therewith, and match pixels between the stereo images to minimize a value of the energy function.

In some example embodiments, the processor is configured to generate an initial disparity map for each of the at least one image.

In some example embodiments, the processor is configured to re-generate the disparity map associated with the at least one image based on the matched pixels.

In some example embodiments, the processor is configured to match the pixels between the stereo images to minimize the value of the energy function based on a coordinate descent algorithm.

In some example embodiments, the processor is configured to match the pixels between the stereo images by, minimizing the smoothness cost of the energy function, minimizing the data cost of the energy function, and verifying whether a condition associated with the energy function is satisfied.

In some example embodiments, the processor is configured to minimize the smoothness cost based on a noise removal algorithm.

In some example embodiments, the processor is configured to, generate the block of which a center is a pixel of the at least one image, detect the neighboring blocks having geometric structures similar to that of the block in the at least one image, and minimize the smoothness cost by collaboratively filtering the block and the neighboring blocks.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
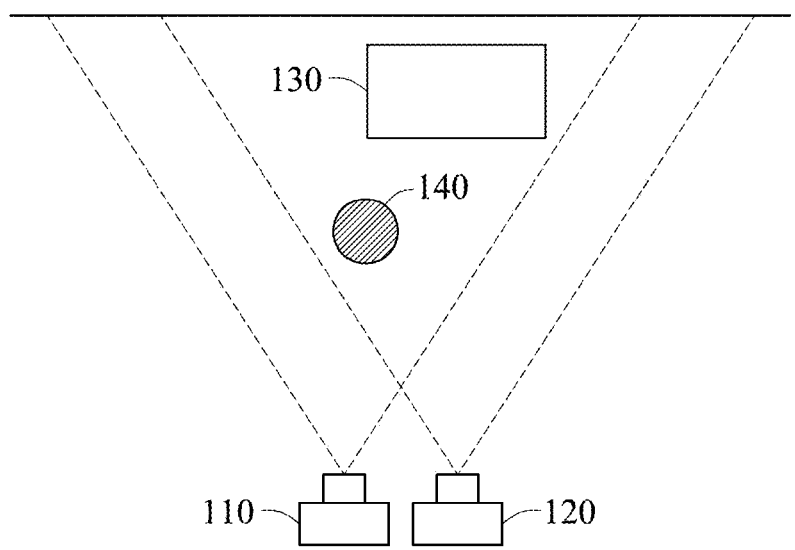
FIG. 1 illustrates a disposition of cameras to be used to photograph stereo images according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be a computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Various example embodiments will now be described more fully with reference to the accompanying drawings in which some example embodiments are shown. In the drawings, the thicknesses of layers and regions are exaggerated for clarity.

FIG. 1 illustrates a disposition of cameras to be used to photograph stereo images according to at least one example embodiment.

Stereo matching or stereo image matching may refer to matching of images obtained by photographing an identical scene from at least two different points of view. The stereo image matching may involve determining a correspondence between pixels of the images.

Referring to FIG. 1, a first camera 110 and a second camera 120 may photograph an identical scene from different points of view. The scene may include a background 130 and a foreground 140.

In an example, the first camera 110 and the second camera 120 may be disposed in parallel in a horizontal alignment. Images photographed by the first camera 110 and the second camera 120 will be illustrated in FIG. 2.

Figure 2:
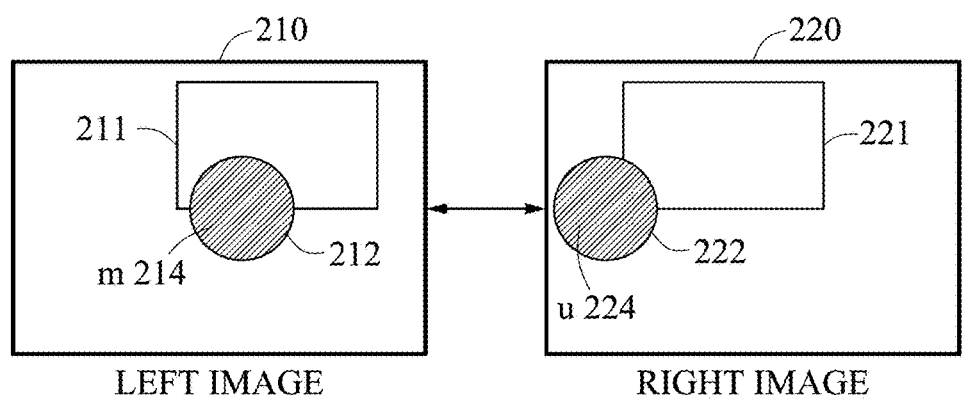
FIG. 2 illustrates generated stereo images according to at least one example embodiment.

FIG. 2 illustrates generated stereo images according to at least one example embodiment.

Referring to FIG. 2, a left image 210 may be an image photographed by the first camera 110 of FIG. 1, and a right image 220 may be an image photographed by the second camera 120 of FIG. 1.

Since the first camera 110 and the second camera 120 have different points of view (POV), the left image 210 and the right image 220 may include the background 130 and the foreground 140 at relatively different positions.

Since the left image 210 and the right image 220 are obtained by photographing the identical scene, the left image 210 and the right image 220 may include identical components. The foreground 140 may correspond to a first foreground 212 and a second foreground 222. Since the first foreground 212 and the second foreground 222 are values obtained by photographing the identical foreground 140, pixels of the first foreground 212 may correspond to pixels of the second foreground 222. For example, a pixel m 214 of the first foreground 212 may correspond to a pixel u 224 of the second foreground 222.

The background 130 may correspond to a first background 211 and a second background 221. Since the first background 211 and the second background 221 are values obtained by photographing the identical background 130, pixels of the first background 211 may correspond to pixels of the second background 221.

When stereo matching is performed between the left image 210 and the right image 220, a displacement or a disparity between the pixel m 214 of the first foreground 212 and the pixel u 224 of the second foreground 222 may be calculated. When the displacement or the disparity is calculated, actual distances from the first camera 110 and the second camera 120 to the foreground 140 may be calculated.

When the first camera 110 and the second camera 120 photograph images at an identical height and an identical tilting angle, the disparity among pixels of the images may occur only in a horizontal direction and not in a vertical direction.

In the process of performing stereo matching between the left image 210 and the second image 220, a disparity map of the left image 210 and a disparity map of the right image 220 may be estimated.

Figure 3:
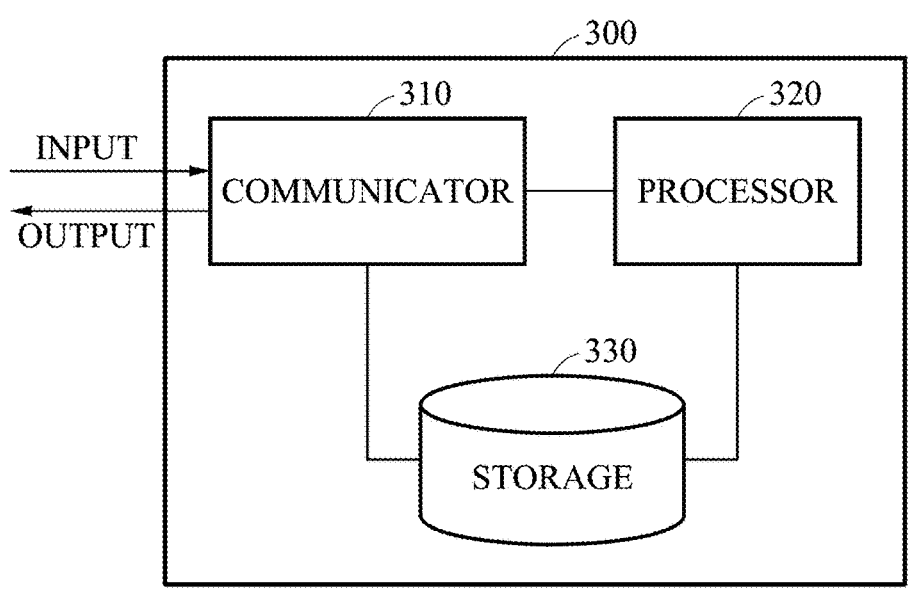
FIG. 3 is a block diagram illustrating a configuration of an apparatus for matching stereo images according to at least one example embodiment.

FIG. 3 is a block diagram illustrating a configuration of an apparatus for matching stereo images according to at least one example embodiment.

Referring to FIG. 3, an apparatus 300 for matching stereo images may include a communicator 310, a processor 320, and a storage 330.

The communicator 310 may include transmitters and/or receivers. The transmitters may include hardware and any necessary software for transmitting signals including, for example, data signals and/or control signals. The receivers may include hardware and any necessary software for receiving signals including, for example, data signals and/or control signals.

The communicator 310 may receive a video or an image from another apparatus.

The processor 320 may be implemented by at least one semiconductor chip disposed on a printed circuit board. The processor 320 may be an arithmetic logic unit, a digital signal processor, a microcomputer, a field programmable array, a programmable logic unit, a microprocessor or any other device capable of responding to and executing instructions in a defined manner.

The processor 320 may be programmed with instructions that configure the processor 420 into a special purpose computer to process data received by the communicator 310 and data in the storage 330 such that the processor 320 matches pixels between stereo images by searching for a corresponding relationship therebetween to reduce (or, alternatively, minimize) a value of an energy function E, and generate a disparity map based on the matched pixels.

The storage 330 may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The storage 330 may store the data received by the communicator 310 and the data processed by the processor 320. For example, the storage 330 may store a video or an image. In an example, the storage 330 may include at least one of a volatile memory, a non-volatile memory, and a hard disk drive. The storage 330 stores an instruction set to perform image processing. The instruction set to perform image processing may be executed by the processor 320.

The processor 320 performs image processing according to the instruction set.

Figure 4:
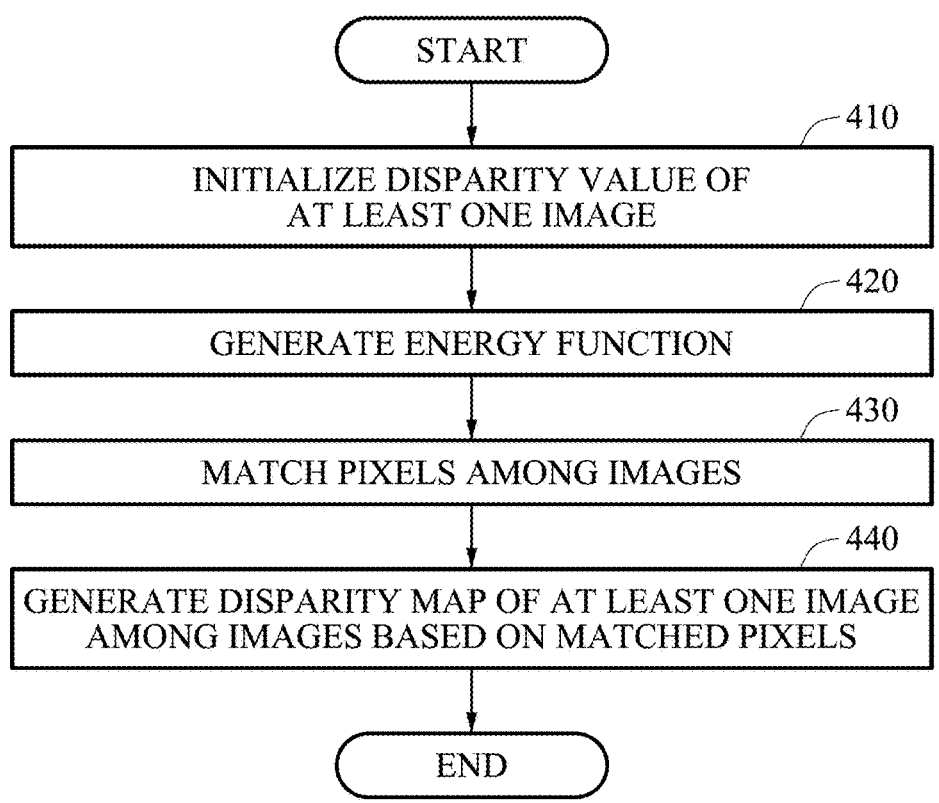
FIG. 4 is a flowchart illustrating a method of matching stereo images according to at least one example embodiment.

FIG. 4 is a flowchart illustrating a method of matching stereo images according to at least one example embodiment.

In operation 410, the processor 320 initializes a disparity value of at least one image among a plurality of images. The image may be a color image, and the disparity value may be a value of a disparity map corresponding to the color image.

The processor 320 may initialize the disparity value by generating an initial disparity map.

In an example, the processor 320 may generate the initial disparity map in which desired (or, alternatively, predetermined) disparity values are set for each pixel. In another example, the processor 320 may generate the initial disparity map in which an identical disparity value is set for each pixel.

In operation 420, the processor 320 generates an energy function E based on a smoothness cost $E_{smoothness}$ and a data cost $E_{Data}$ of the image. The energy function E may be a function used to match pixels among pixels of the plurality of images.

The smoothness cost may be calculated based on a similarity of disparity structures between a block of which a center is a pixel of the image and neighboring blocks of the block. For example, an area of the block may overlap areas of the neighboring blocks. A disparity structure may be a structure of the disparity map generated according to a geometric structure of the color image. The data cost may be calculated based on a pixel value of matched pixels among the pixels of the images according to the disparity value of the image.

The processor 320 may calculate a cost for matching the pixels among the pixels of the images estimated using the energy function E. The processor 320 may output a result of matching the pixels when the calculated value of the energy function E is reduced (or, alternatively, minimized).

For example, the processor 320 may calculate the energy function E using Equation 1.

$$E(d_1,d_2,\ldots,d_N) = E_{Data}(d_1,d_2,\ldots,d_N) + \lambda E_{smoothness}(d_1,d_2,\ldots,d_N) \quad \text{[Equation 1]}$$

In Equation 1, N denotes a number of pixels included in an image, and $d_1$ through $d_N$ denote disparity values of each of the pixels included in the image. $E(d_1, d_2, \ldots, d_N)$ denotes an energy function of the image, $E_{Data}(d_1, d_2, \ldots, d_N)$ denotes a data cost of the image, $E_{Smoothness}(d_1, d_2, \ldots, d_N)$ denotes a smoothness cost of the image, and $\lambda$ denotes a parameter to adjust a ratio of the data cost and the smoothness cost.

For example, the processor 320 may calculate the data cost using Equation 2.

$$E_{Data}(d_1,d_2,\ldots,d_N) = \sum_{m=1}^{N} \phi(I_m^l, I_{m-d_m}^r) \quad \text{[Equation 2]}$$

In Equation 2, $I_m^l$ denotes a color value of a pixel m of a left image, and $I_{m-d_m}^r$ denotes a color value of a pixel $m-d_m$ of a right image corresponding to the pixel m of the left image. $\phi(I_m^l, I_{m-d_m}^r)$ denotes a difference degree between the color value of the pixel m of the left image and the color value of the pixel $m-d_m$ of the right image corresponding to the pixel m of the left image.

The processor 320 may calculate the difference degree between pixels $\phi(I_m^l, I_{m-d_m}^r)$ using Equation 3.

$$\phi(I_m^l, I_{m-d_m}^r) = \frac{1}{\sigma} \|I_m^l - I_{m-d_m}^r\| \quad \text{[Equation 3]}$$

A difference degree between pixels may be calculated based on a difference between respective color values of corresponding pixels. In Equation 3, $\sigma$ denotes a constant.

The smoothness cost may be calculated based on a similarity of disparity structures between a block of which a center is a desired (or, alternatively, a predetermined) pixel of an image and neighboring blocks of the block.

For example, the processor 320 may calculate the smoothness cost of the left image as follows. With respect to each pixel of the left image, the block of which the center is the predetermined pixel may be set and the neighboring blocks geometrically similar to the block may be detected. The processor 320 may group the block and the neighboring blocks, and calculate a minimum rank to approximate blocks of a group within a desired (or, alternatively, a predetermined) threshold. A rank may be a common characteristic of the blocks. The processor 320 may calculate the smoothness cost of the left image by adding up rank values calculated for all pixels of the left image.

Detailed descriptions of an energy function E, a smoothness cost $E_{Smoothness}$, and a data cost $E_{Data}$ will be provided with reference to FIGS. 5 through 10.

In operation 430, the processor 320 matches the pixels among the images to reduce (or, alternatively, minimize) a value of the energy function E. The processor 320 may match the pixels among the pixels of the images to minimize a sum of the data cost $E_{Data}$ of the energy function and the smoothness cost $E_{Smoothness}$ of the energy function. For example, the processor 320 may calculate a cost of an estimated matching relationship and repeatedly estimate the matching relationship when a result of the matching is not satisfactory.

In an example, the processor 320 may match the pixels among the pixels of the images to reduce (or, alternatively, minimize) the value of the energy function E based on a coordinate descent algorithm. Detailed descriptions of a method of matching pixels among pixels of the images based on a coordinate descent algorithm will be provided with reference to FIGS. 5 through 10.

In operation 440, the processor 320 generates a disparity map of the at least one image among the plurality of images based on the matched pixels. For example, the processor 320 may generate the disparity map by adjusting the disparity value of the initial disparity map based on the result of the matching of the pixels.

Thereafter, the processor 320 may utilize the disparity map to determine the depth of the background 130 and/or the foreground 140 and utilize the depth information to perform various functions. For example, the processor 320 may perform image processing such as generating a 3D image based on the disparity map and/or automatically direct a device such as an autonomous vehicle or a robotic device based on the disparity map.

Figure 5:
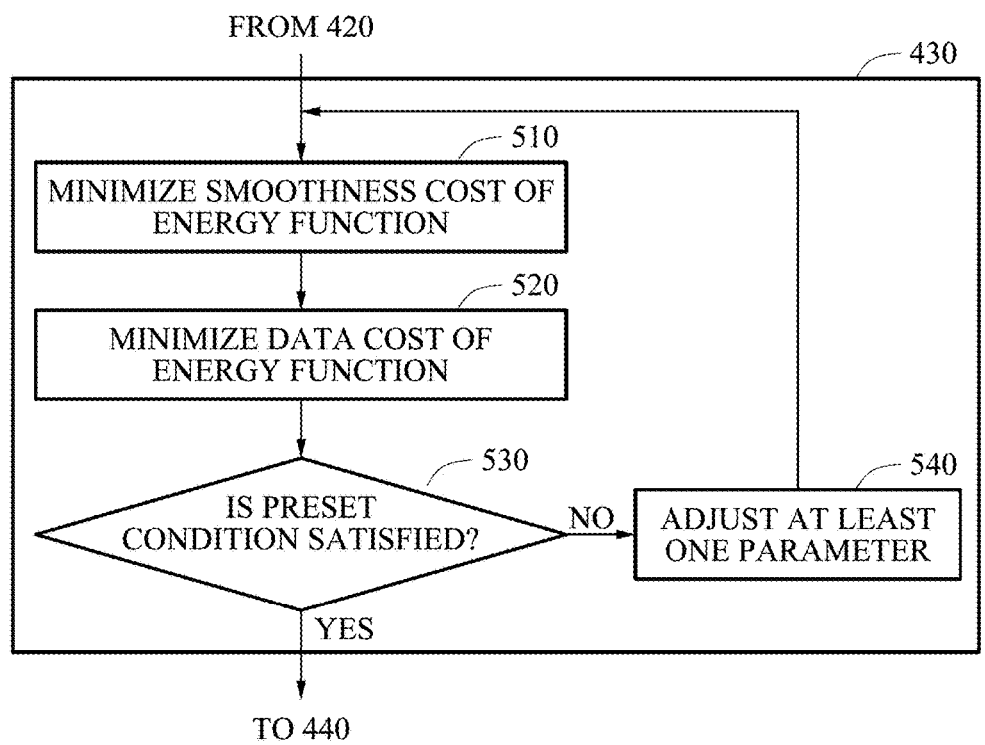
FIG. 5 is a flowchart illustrating a method of matching pixels between images according to at least one example embodiment.

FIG. 5 is a flowchart illustrating a method of matching pixels among pixels of the images according to at least one example embodiment.

Referring to FIG. 5, in an example, a coordinate descent algorithm may be used to match pixels between images. The processor 320 may search for a local minimum value of an energy function based on the coordinate descent algorithm. Although the local minimum value differs from a global minimum value, the local minimum value may be a satisfactory result for a user. The energy function E may be transformed into a transformed energy function E' to search for the local minimum value. In the energy function, a variable $d_m$ may be divided into variables $d_m$ and $t_m$. For example, the processor 320 may transform the energy function E into the transformed energy function E' using Equation 4.

$$E'(d_1, \ldots, d_N, t_1, \ldots, t_N) = E_{Data}(d_1, \ldots, d_N) + \quad \text{[Equation 4]}$$
$$\lambda E_{Smoothness}(t_1, \ldots, t_N) + \frac{1}{2\beta}\sum_{m=1}^{N}(d_m - t_m)^2$$

In Equation 4, $t_1$ through $t_n$ are defined as variables differing from $d_1$ through $d_n$ to separate a variable for a data cost from a variable for a smoothness cost. $E'(d_1, \ldots, d_N, t_1, \ldots, t_N)$ denotes the transformed energy function. In $$\frac{1}{2\beta}\sum_{m=1}^{N}(d_m - t_m)^2,$$

β denotes a preset constant and the divided variables $d_m$ and $t_m$ are originally identical when β becomes 0. To minimize the value of the transformed energy function $E'(d_1, \ldots, d_N, t_1, \ldots, t_N)$ with respect to the divided variables $t_1$ through $t_n$ and $d_1$ through $d_N$ may be identical to minimize the value of an original energy function $E(d_1, d_2, \ldots, d_N)$.

As discussed above, in operation 420 of FIG. 4, the processor 320 may generate the energy function E from which an original function is transformed.

The coordinate descent algorithm may refer to a process for setting the variables $d_1$ through $d_N$ as fixed values, minimizing values of the variables $t_1$ through $t_N$, setting the variables $t_1$ through $t_N$ as fixed values, and then minimizing values of the variables $d_1$ through $d_N$. The processor 320 may iteratively execute the coordinate descent algorithm until the local minimum value of the energy function is determined. In an example, the local minimum value may be a value when the process is iteratively performed a desired (or, alternatively, a predetermined) number of times. In another example, when the iterative performances result in an identical calculated value of the energy function, the calculated value of the energy function may be determined as the local minimum value.

The processor 320 may use at least one of an augmented Lagrange method including a Lagrange variable, an alternating direction method of multipliers (ADMM), and a split Bregman method to calculate a value of an energy function of which a variable is divided.

In performing operation 430 of FIG. 4, the processor 320 may perform operations 510 through 540 of FIG. 5.

In operation 510, the processor 320 minimizes the smoothness cost of the energy function. The processor 320 may set the variables $d_1$ through $d_N$ for the data cost in the energy function of Equation 4 as constants, and minimize the value of the energy function with respect to the variables $t_1$ through $t_N$ for the data cost. A portion corresponding to the data cost in a function may be set as constants, and the processor 320 may utilize Equation 5 as the function for minimizing the smoothness cost.

$$E'(t_1, \ldots, t_N; d_1, \ldots, d_N) = \quad \text{[Equation 5]}$$
$$\lambda E_{Smoothness}(t_1, \ldots, t_N) + \frac{1}{2\beta}\sum_{m=1}^{N}(t_m - d_m)^2$$

In Equation 5, a function $E_1'(t_1, \ldots, t_N; d_1, \ldots, d_N)$ may be the energy function for the smoothness cost. The portion corresponding to the data cost in the energy function may be set as the constant. A portion $$\frac{1}{2\beta}\sum_{m=1}^{N}(t_m - d_m)^2$$

in Equation 5 may correspond to the data cost. The portion $$\frac{1}{2\beta}\sum_{m=1}^{N}(t_m - d_m)^2$$

may be identically regarded as a data cost for removing a noise from an image distorted by an additive white Gaussian noise (AWGN) of which a standard deviation is $\sqrt{\beta}$. A desired (or, alternatively, a predetermined) algorithm used to remove a noise from an image may be used to minimize the smoothness cost. Minimizing the smoothness cost may involve searching for a disparity value $d_m$ with respect to each pixel m.

In an example, the smoothness cost may be minimized based on a low-rank characteristic of blocks having similar geometric structures in an image. The processor 320 may minimize the smoothness cost by collaboratively filtering the blocks. Detailed descriptions of a method of minimizing a smoothness cost by collaboratively filtering blocks will be provided with respect to FIGS. 6 and 10.

In operation 520, the processor 320 minimizes the data cost of the energy function.

For example, the processor 320 may set the variables $t_1$ through $t_N$ for the smoothness cost in the energy function of Equation 4 as the constants, and minimize the value of the energy function with respect to the variables $d_1$ through $d_N$ for the smoothness cost. A portion corresponding to the smoothness cost in a function may be set as a constant, and the processor 320 may utilize the function of Equation 6 for minimizing the data cost.

$$E'_2(d_1, \ldots, d_N; t_1, \ldots, t_N) = \qquad [\text{Equation 6}]$$
$$E_{Data}(d_1, \ldots, d_N) + \frac{1}{2\beta}\sum_{m=1}^{N}(d_m - t_m)^2$$

In Equation 6, a function $E_1'(t_1, \ldots, t_N; d_1, \ldots, d_N)$ may be the energy function for the data cost. The portion corresponding to the smoothness cost in the energy function may be set as the constant.

For example, when Equation 2 is used for the data cost, Equation 6 may be transformed to be Equation 7.

$$E'_2(d_1, \ldots, d_N; t_1, \ldots, t_N) = \qquad [\text{Equation 7}]$$
$$\sum_{m=1}^{N}\left[\phi(I^l_m, I^r_{m-d_m}) + \frac{1}{2\beta}(d_m - t_m)^2\right]$$

The processor 320 may determine a value of $d_m$ to minimize a value of $$\phi(I^l_m, I^r_{m-d_m}) + \frac{1}{2\beta}(d_m - t_m)^2$$

for each pixel of the image.

As another example, to minimize the data cost, the processor 320 may consider a consistency between a disparity map of a left image and a disparity map of a right image.

To consider the consistency between the disparity maps, the processor 320 may concurrently compare the disparity maps. When the disparity maps are concurrently compared, the processor 320 may initialize a disparity value of the left image and a disparity value of the right image in operation 410. In operation 420, the processor 320 may generate the energy function as shown in Equation 8.

$$E(d^l_1, \ldots, d^l_N, d^r_1, \ldots, d^r_N) = \qquad [\text{Equation 8}]$$
$$E_{Data}(d^l_1, \ldots, d^l_N, d^r_1, \ldots, d^r_N) +$$
$$\lambda E_{Smoothness}(d^l_1, \ldots, d^l_N, d^r_1, \ldots, d^r_N)$$

In Equation 8, $d^l_1$ through $d^l_N$ denote disparity values of each pixel included in the left image, and $d^r_1$ through $d^r_N$ denote disparity values of each pixel included in the right image. In the energy function, a variable $d^l_m$ may be divided to $d^l_m$ and $t^l_m$, and a variable $d^r_m$ may be divided to $d^r_m$ and $t^r_m$. For example, the energy function may be transformed into Equation 9.

$$E'(d^l_1, \ldots, d^l_N, d^r_1, \ldots, d^r_N; t^l_1, \ldots, t^l_N, t^r_1, \ldots, t^r_N) = E_{Data}(d^l_1, \ldots, d^l_N, d^r_1, \ldots, d^r_N) + \lambda E_{Smoothness}(t^l_1, \ldots, t^l_N, t^r_1, \ldots, t^r_N) \qquad [\text{Equation 9}]$$

The processor 320 may set variables $t^l_1$ through $t^l_N$ and $t^r_1$ through $t^r_N$ for the smoothness cost as constants in the energy function of Equation 9, and minimize the value of the energy function with respect to variables $d^l_1$ through $d^l_N$ and $d^r_1$ through $d^r_N$ for the data cost. A portion corresponding to the smoothness cost in a function may be set as a constant, and the function for minimizing the data cost may be Equation 10.

$$E'_2(d^l_1, \ldots, d^l_N, d^r_1, \ldots, d^r_N; t^l_1, \ldots, t^l_N, t^r_1, \ldots, t^r_N) = \qquad [\text{Equation 10}]$$
$$E_{Data}(d^l_1, \ldots, d^l_N, d^r_1, \ldots, d^r_N) +$$
$$\frac{1}{2\beta}\sum_{m=1}^{N}(d^l_m - t^l_m)^2 + \frac{1}{2\beta}\sum_{n=1}^{N}(d^r_n - t^r_n)^2$$

A data cost $E_{Data}(d^l_1, \ldots, d^l_N, d^r_1, \ldots, d^r_N)$ may be calculated based on a geometric structure of the pixel m of the left image and the pixel $m-d^l_m$ of the right image. The data cost may be calculated for all pixels included in the left image and the right images. Equation 11 may be used to calculate a data cost based on a geometric structure among corresponding pixels. The geometric structure may include an occlusion, a match, and an inconsistency.

$$E_{Data}(d^l_1, \ldots, d^l_N, d^r_1, \ldots, d^r_N) = \qquad [\text{Equation 11}]$$
$$\sum_{m=1}^{N}\begin{cases} c_o, & \text{if } d^l_m < d^r_{m-d^l_m} \text{ [occluded]} \\ \phi(I^l_m, I^r_{m-d^l_m}), & \text{if } d^l_m = d^r_{m-d^l_m} \text{ [matched]} \\ c_i, & \text{otherwise[inconsistent]} \end{cases} +$$
$$\sum_{m=1}^{N}\begin{cases} c_o, & \text{if } d^r_n < d^l_{n+d^r_n} \text{ [occluded]} \\ \phi(I^l_{n+d^r_n}, I^r_n), & \text{if } d^r_n = d^l_{n+d^r_n} \text{ [matched]} \\ c_i, & \text{otherwise[inconsistent]} \end{cases}$$

$d_m^l$ denotes a disparity value of the pixel m of the left image, and $d_{m-d_m}^r$ denotes a disparity value of the pixel $m-d_m^l$ of the right image corresponding to the pixel m.

When the disparity value $d_m^l$ is less than the disparity value $d_{m-d_m}^r$, the pixel m of the left image may be determined to be occluded by the pixel $m-d_m^l$ of the right image. Thus, the data cost for the pixel m may be allocated a desired (or, alternatively, a predetermined) value $C_o$.

When the disparity value $d_m^l$ is greater than the disparity value $d_{m-d_m}^r$, the pixel m of the left image may be determined to be inconsistent with the pixel $m-d_m^l$ of the right image. Thus, the data cost for the pixel m may be allocated a desired (or, alternatively, a predetermined) value $C_i$. Ideally, $C_i$ has an infinite value, however, $C_i$ may have a finite constant value to be implemented as an algorithm.

The processor 320 may use a message passing algorithm, a graph cut algorithm, or a mean field approximation to calculate the data cost.

Although operation 520 is described and illustrated as being performed after operation 510 is performed, operation 520 may be performed before operation 510 is performed. Operations 510 and 520 may be operations of matching a pixel of a left image and a pixel of a right image and calculating a cost of relationships of the matched pixels.

In operation 530, the processor 320 verifies whether a desired (or, alternatively, a preset) condition is satisfied.

For example, the preset condition may be whether the value of the energy function is substantially identical (or, alternatively, identical) to a value of a previously calculated value of the energy function. In another example, the preset condition may be whether a number of times operations 510 and 520 of matching the pixels are performed reaches a threshold (or, alternatively, preset number of times).

In operation 540, the processor 320 adjusts at least one parameter of the energy function when the preset condition is not satisfied. For example, the processor 320 may adjust a parameter β in Equation 4. When operation 430 is performed again, the parameter β may be adjusted to be decreased.

The processor 320 may iteratively perform operations 510 through 540 such that the local minimum value of the energy function may be determined.

Figure 6:
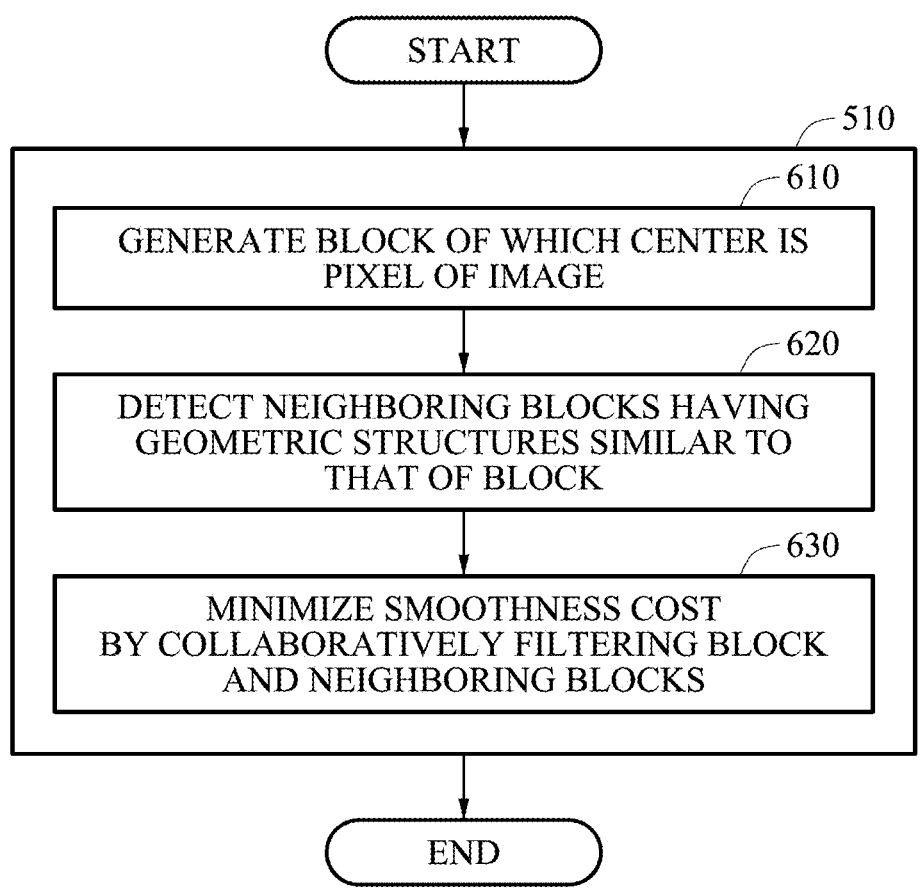
FIG. 6 is a flowchart illustrating a method of minimizing a smoothness cost according to at least one example embodiment.

FIG. 6 is a flowchart illustrating a method of minimizing a smoothness cost according to at least one example embodiment.

Referring to FIG. 6, when performing operation 510, the processor 320 may perform operations 610 through 630. The processor 320 may calculate a smoothness cost of an image by collaboratively filtering blocks of which geometric structures are similar in the image.

In operation 610, the processor 320 may generate a block of which a center is a pixel of the image. The block may be a patch and a size of the block may be set in advance. For example, the size of the block may be 15×15.

In operation 620, the processor 320 may detect at least one of neighboring blocks having geometric structures similar to that of the generated block in the image. A size of the at least one of neighboring blocks may be identical to the size of the block. A geometric structure may be a texture of a block. The texture may include at least one of an edge and a corner. For example, the processor 320 may calculate a gradient of an edge of the block, and detect the neighboring blocks of which gradients are similar to that of the block. The processor 320 may use a routine of block matching included in a block-matching and three-dimensional filtering (BM3D) in order to detect the neighboring blocks.

In operation 630, the processor 320 determines a rank for grouping blocks by collaboratively filtering the block and the neighboring blocks. The blocks of a group may be modeled based on a low rank characteristic. Detailed descriptions of modeling blocks will be provided with reference to FIG. 10.

The processor 320 may minimize the smoothness cost based on a low rank model. For example, the processor 320 may match pixels to minimize the smoothness cost and calculate the smoothness cost for the matched pixels.

Figure 7:
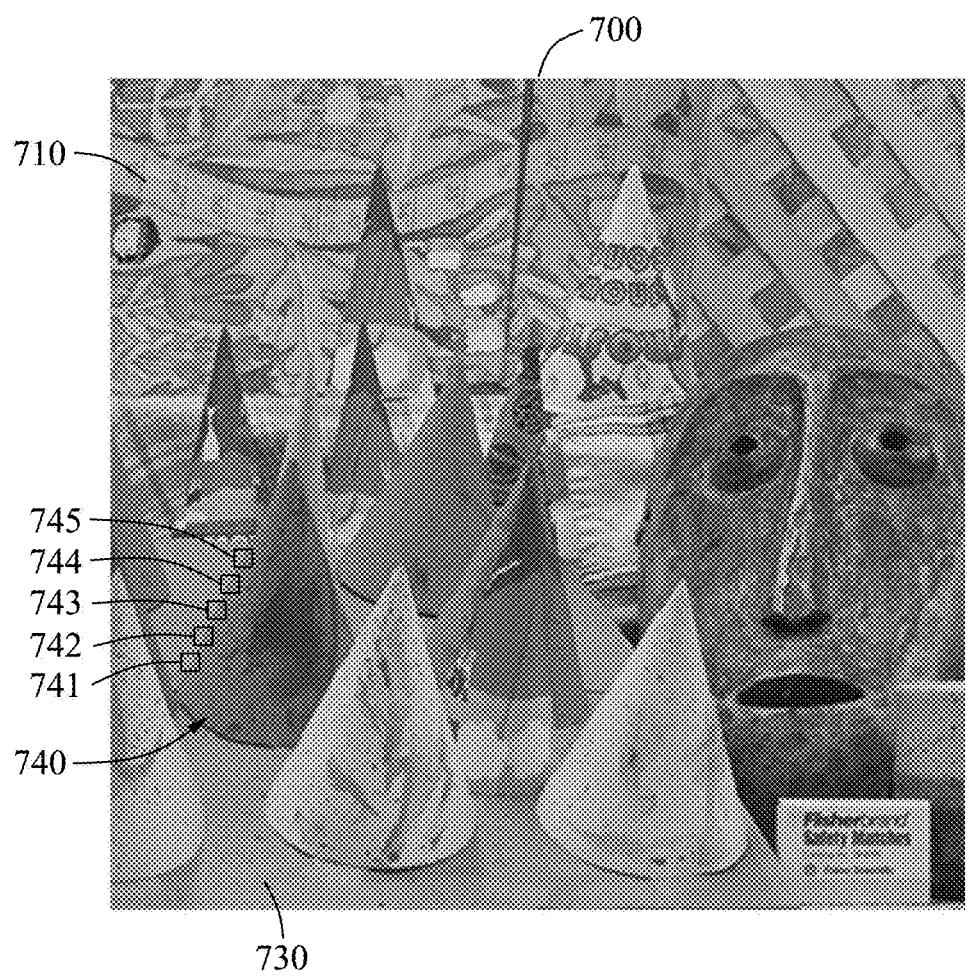
FIG. 7 illustrates an image according to at least one example embodiment.

FIG. 7 illustrates an image according to at least one example embodiment.

Referring to FIG. 7, a color image 700 may include a background area 710, a foreground area 730, and an object 740. For example, the foreground area 730 may include an image of a table and a distance between the foreground area 730 and a camera increases toward a top of the color image 700. The object 740 may appear above the foreground area 730. A boundary between the foreground area 730 and the object 740 may form a similar geometric structure.

The processor 320 may detect blocks 741 through 745 having similar geometric structures to that of the foreground area 730 and the object 740.

Figure 8:
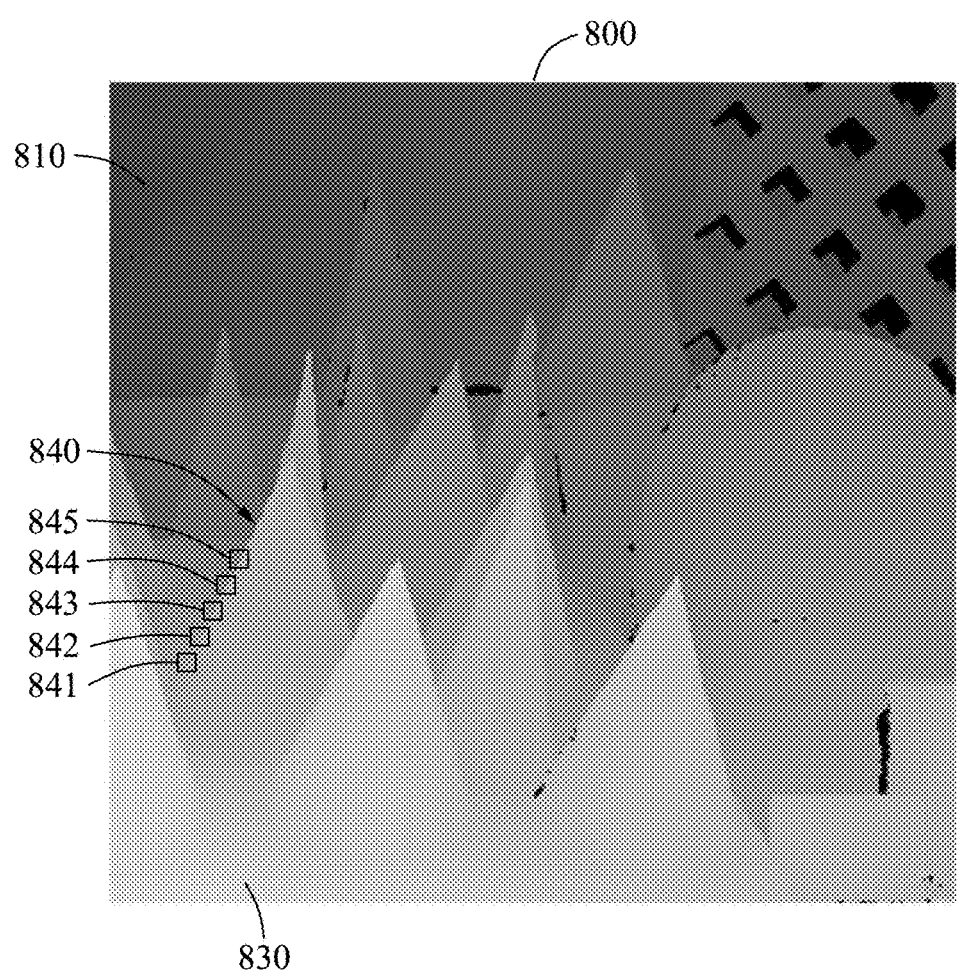
FIG. 8 illustrates a disparity map according to at least one example embodiment.

FIG. 8 illustrates a disparity map according to at least one example embodiment.

Referring to FIG. 8, a disparity map 800 may correspond to the color image 700. A disparity area 810 may correspond to the background area 710, a disparity area 830 of a foreground area may correspond to the foreground area 730, and a disparity area 840 of an object may correspond to the object 740. The processor 320 may detect, in the disparity map 800, blocks 841 through 845 corresponding to the blocks 741 through 745 detected in the color image 700. The detected blocks 841 through 845 detected in operation 610 of FIG. 6 may be blocks in the disparity map 800.

Figure 9:
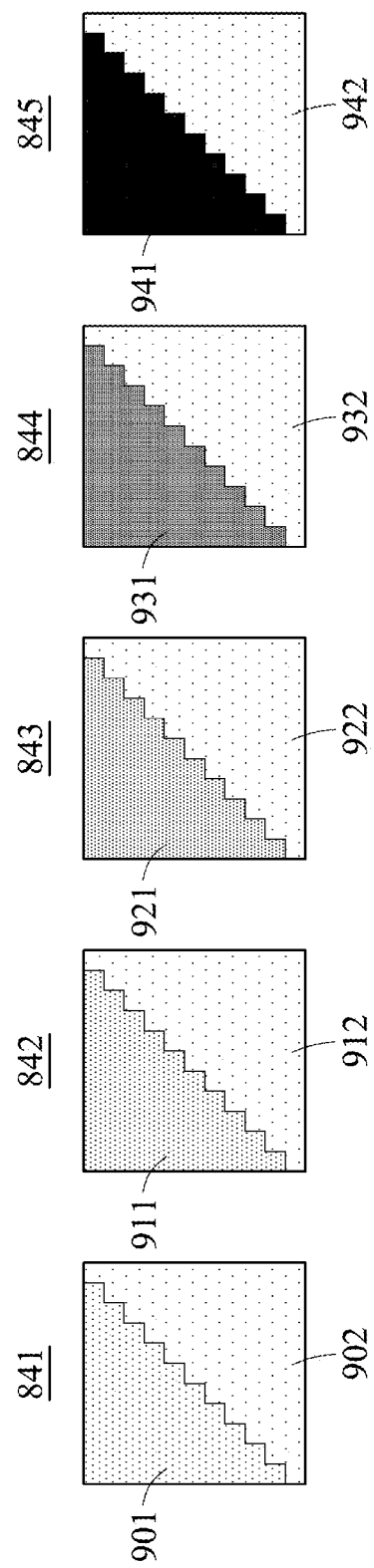
FIG. 9 illustrates blocks having similar geometric structures according to at least one example embodiment.

FIG. 9 illustrates blocks having similar geometric structures according to at least one example embodiment.

The blocks 841 through 845 may be blocks that are grouped together as they have similar disparity structures. The block 841 includes a portion 902 of an object and a portion 901 of a foreground. The block 842 includes a portion 912 of the object and a portion 911 of the foreground. The block 843 includes a portion 922 of the object and a portion 921 of the foreground. The block 844 includes a portion 932 of the object and a portion 931 of the foreground. The block 845 includes a portion 942 of the object and a portion 941 of the foreground.

Since each of the portions 902, 912, 922, 932, and 942 of the object has a similar (or, alternatively, an identical) depth, disparity values of the portions 902, 912, 922, 932, and 942 may be similar (or, alternatively, identical). Since each of the portions 901, 911, 921, 931, and 941 has a different depth, the processor 320 may determine that the disparity values of the portions 901, 911, 921, 931, and 941 are different from each other. For example, a depth of the portion 901 of the foreground may be smallest and a depth of the portion 941 of the foreground may be greatest.

Figure 10:
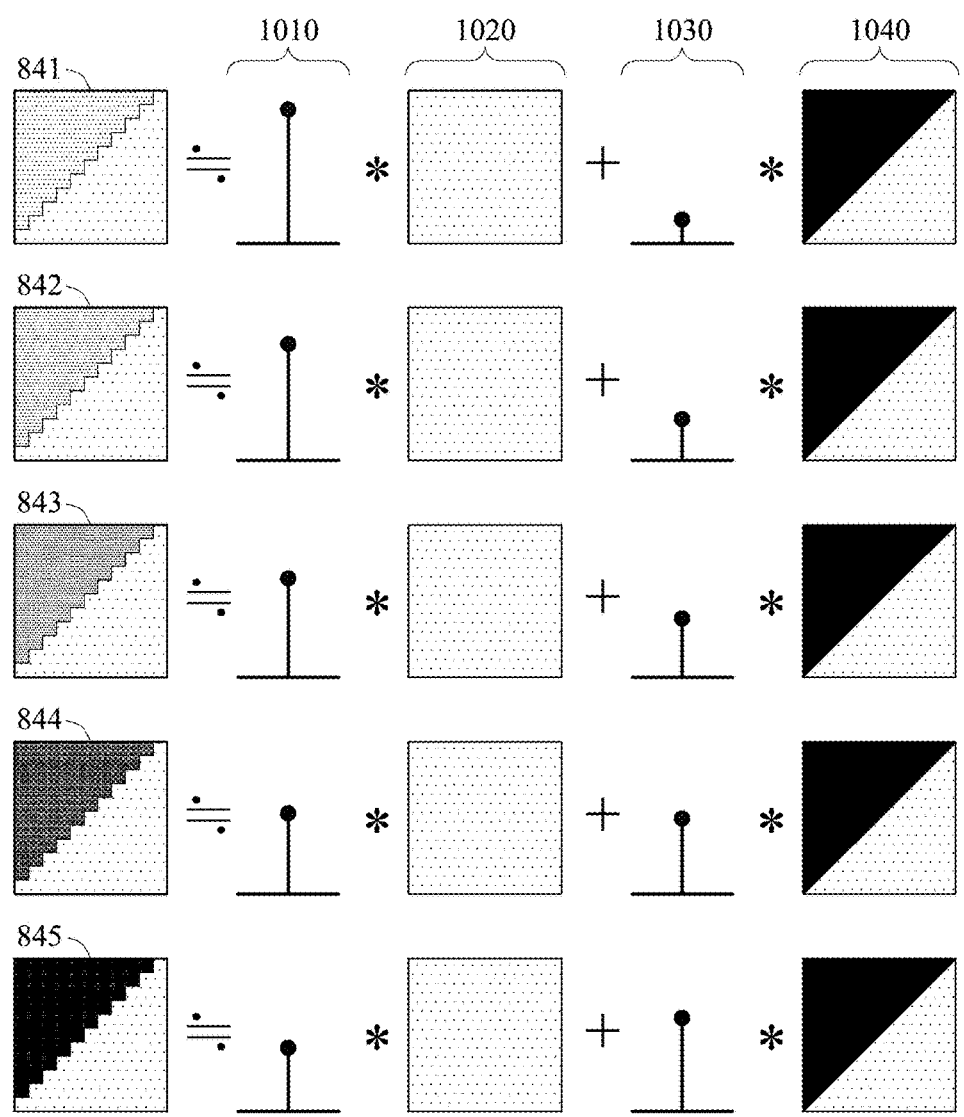
FIG. 10 illustrates a method of representing a relationship of similar blocks based on a low rank according to at least one example embodiment.

FIG. 10 illustrates a method of representing a relationship of similar blocks based on a low rank according to at least one example embodiment.

Since the blocks 841 through 845 have similar geometric structures, the blocks 841 through 845 may be classified as having a small number of characteristics according to a structure. For example, the processor 320 may classify the blocks 841 through 845 as having at least one of common characteristics 1020 and 1040 by reconstructing the blocks 841 through 845 based on portions of a background and portions of an object.

The common characteristics 1020 and 1040 may be expressed by fixed values. For example, the characteristic 1020 may be an average value of a disparity value of the object and a disparity value of the foreground, and the characteristic 1040 may be a difference value between the disparity value of the object and the disparity value of the foreground area.

Values for the characteristics 1020 and 1040 may be expressed by sizes 1010 and 1030. For example, the sizes 1010 may be a value for the characteristic 1020, and the sizes 1030 may be a value for the characteristic 1040. The blocks 841 through 845 may have different sizes with respect to each characteristic. For example, the blocks 841 through 845 may have different sizes 1010 with respect to the characteristic 1020, and have different sizes with respect to the characteristic 1040.

A method of representing the blocks 841 through 845 illustrated in FIG. 10 may be changed to be a method using a matrix. For example, when the blocks 841 through 845 are five in number, characteristics of the blocks, for example, ranks, are two in number, and the pixels included in each block are one hundred in number, a matrix generated indicating the blocks 841 through 845 may be a (100×2)*(2×5) matrix.

Since disparity structures of the blocks 841 through 845 are similar, the generated matrix may be a low rank matrix. A method of generating the matrix may involve collaborative filtering. The processor 320 may process the matrix based on a noise removal algorithm. The processor 320 may determine a disparity value on which smoothness is performed for a corresponding pixel by processing the matrix and performing low-rank approximation.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of matching stereo images having different points of view, the method comprising:
   initializing a disparity value of a first disparity map corresponding to a first image of the stereo images;
   generating, based on a smoothness cost and a data cost, an energy function for matched stereo images according to the first disparity map, the smoothness cost being based on a similarity between a block of the first image and at least one neighboring block of the first image, and the data cost being based on a pixel value difference of matched pixels between the stereo images according to the disparity value;
   re-matching pixels between the stereo images to generate the re-matched pixels that reduce a value of the energy function; and
   adjusting the first disparity map based on the re-matched pixels,
   wherein the re-matching includes,
      minimizing the smoothness cost of the energy function with setting variables for the data cost of the energy function as constants, minimizing the data cost of the energy function with setting variables for the smoothness cost of the energy function as constants, and verifying whether a condition associated with the energy function is satisfied.

2. The method of claim 1, wherein the initializing comprises:

generating the first disparity map as an initial disparity map.

3. The method of claim 1, wherein the re-matching comprises:

matching the pixels between the stereo images to minimize the value of the energy function based on a coordinate descent algorithm.

4. The method of claim 1, wherein the re-matching further comprises:

adjusting at least one parameter of the energy function, if the verifying indicates that the condition is not satisfied.

5. The method of claim 1, wherein the condition is whether a difference between the value of the energy function and a previously calculated value of the energy function is less than a preset threshold.

6. The method of claim 1, wherein the condition is whether the re-matching has been iteratively performed a threshold number of times.

7. The method of claim 1, wherein the minimizing the smoothness cost comprises:

minimizing the smoothness cost based on a noise removal algorithm.

8. The method of claim 1, wherein the minimizing the smoothness cost comprises:

generating the block of which a center is a pixel of the first image;

detecting neighboring blocks of the at least one neighboring block having at least one common geometric structure to that of the block in the image; and minimizing the smoothness cost by collaboratively filtering the block and the neighboring blocks.

9. The method of claim 1, wherein the data cost is calculated based on all pixels of the stereo images.

10. The method of claim 1, wherein the data cost is calculated based on geometric structures among corresponding pixels.

11. A non-transitory computer-readable medium comprising program code that, when executed by a processor, configures the processor to match stereo images having different points of view by, initializing a disparity value of a first disparity map corresponding to a first image of the stereo images, generating, based on a smoothness cost and a data cost, an energy function for matched stereo images according to the first disparity map, the smoothness cost being based on a similarity between a block of the first image and at least one neighboring block of the first image, and the data cost being based on a pixel value difference of matched pixels between the stereo images according to the disparity value, re-matching pixels between the stereo images to generate re-matched pixels that reduce a value of the energy function, and adjusting the first disparity map based on the re-matched pixels, wherein the re-matching includes, minimizing the smoothness cost of the energy function with setting variables for the data cost of the energy function as constants, minimizing the data cost of the energy function with setting variables for the smoothness cost of the energy function as constants, and verifying whether a condition associated with the energy function is satisfied.

12. An apparatus configured to match stereo images having different points of view, the apparatus comprising:

a memory device configured to store the stereo images having different points of view; and a processor configured to, initialize a disparity value of a first disparity map corresponding to a first image of the stereo images, generate, based on a smoothness cost and a data cost, an energy function for matched stereo images according to the first disparity map, the smoothness cost being based on a similarity between a block of the first image and at least one neighboring block of the first image, and the data cost being based on a pixel value difference of matched pixels between the stereo images according to the disparity value, re-match pixels between the stereo images to generate re-matched pixels that reduce a value of the energy function, and adjust the first disparity map based on the re-matched pixels, wherein the processor is configured to re-match the pixels between the stereo images by, minimizing the smoothness cost of the energy function with setting variables for the data cost of the energy function as constants, minimizing the data cost of the energy function with setting variables for the smoothness cost of the energy function as constants, and verifying whether a condition associated with the energy function is satisfied.

13. The apparatus of claim 12, wherein the processor is configured to generate the first initial disparity map as an initial disparity map.

14. The apparatus of claim 12, wherein the processor is configured to re-match the pixels between the stereo images to minimize the value of the energy function based on a coordinate descent algorithm.

15. The apparatus of claim 12, wherein the processor is configured to minimize the smoothness cost based on a noise removal algorithm.

16. The apparatus of claim 12, wherein the processor is configured to, generate the block of which a center is a pixel of the first image, detecting neighboring blocks of the at least one neighboring block having at least one common geometric structure to that of the block in the at least one image, and minimize the smoothness cost by collaboratively filtering the block and the neighboring blocks.

* * * * *